US009942605B2

(12) United States Patent
Lee et al.

(10) Patent No.: US 9,942,605 B2
(45) Date of Patent: Apr. 10, 2018

(54) DEVICES AND METHODS FOR TRANSMITTING AND RECEIVING DATA OF A SINK DEVICE TO CHANGE VIDEO DISPLAY RESOLUTION BASED ON ERROR COUNTER VALUE DETECTED AT THE SINK DEVICE USING HDMI

(71) Applicant: LG ELECTRONICS INC., Seoul (KR)

(72) Inventors: Hyeonjae Lee, Seoul (KR); Dokyun Kim, Seoul (KR); Jangwoong Park, Seoul (KR); Hyunsik Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/125,563

(22) PCT Filed: Mar. 11, 2015

(86) PCT No.: PCT/KR2015/002342
§ 371 (c)(1),
(2) Date: Sep. 12, 2016

(87) PCT Pub. No.: WO2015/137716
PCT Pub. Date: Sep. 17, 2015

(65) Prior Publication Data

US 2017/0006336 A1 Jan. 5, 2017

Related U.S. Application Data

(60) Provisional application No. 61/952,109, filed on Mar. 12, 2014.

(51) Int. Cl.
*H04N 21/4363* (2011.01)
*H04N 21/81* (2011.01)
(Continued)

(52) U.S. Cl.
CPC ..... *H04N 21/43635* (2013.01); *H04L 1/0045* (2013.01); *H04N 21/41* (2013.01);
(Continued)

(58) Field of Classification Search
None
See application file for complete search history.

(56) References Cited

U.S. PATENT DOCUMENTS 8,253,860 B2 * 8/2012 Hsiao .................... G06F 3/1454 348/554
2009/0256963 A1 * 10/2009 Sato ..................... H04N 5/4401 348/554
(Continued)

FOREIGN PATENT DOCUMENTS

KR 10-2010-0104025 9/2010
KR 10-2010-0137693 12/2010
(Continued)

OTHER PUBLICATIONS

HDMI Forum, HDMI Specification Version 2.0, Sep. 4, 2013, http://memp.qiniudn.com/Meekdai.com_HDMI_Spec_2.0.pdf.*
(Continued)

*Primary Examiner* — Hoang Vu A Nguyen Ba
(74) *Attorney, Agent, or Firm* — Lee Hong Degerman Kang & Waimey

(57) ABSTRACT

A method for transmitting and receiving data of a sink device by using HDMI is disclosed. A method for transmitting and receiving data of a sink device by using HDMI comprises receiving video data through at least one channel of HDMI from a source device; generating an error counter value by performing CED (Character Error Detection) on the received video data; in case the error counter value exceeds a threshold value, transmitting to the source device a CEC message requesting resolution change of the video
(Continued)

data; and receiving video data with a resolution changed according to the CEC message from the source device.

18 Claims, 15 Drawing Sheets

(51) Int. Cl.

| | |
|---|---|
| ***H04N 21/439*** | (2011.01) |
| ***H04N 21/472*** | (2011.01) |
| ***H04N 21/434*** | (2011.01) |
| ***H04N 21/435*** | (2011.01) |
| ***H04N 21/84*** | (2011.01) |
| ***H04N 21/4425*** | (2011.01) |
| ***H04N 21/61*** | (2011.01) |
| ***H04N 21/43*** | (2011.01) |
| ***H04N 21/41*** | (2011.01) |
| ***H04L 1/00*** | (2006.01) |

(52) U.S. Cl.

CPC ........... *H04N 21/43* (2013.01); *H04N 21/434* (2013.01); *H04N 21/435* (2013.01); *H04N 21/439* (2013.01); *H04N 21/4341* (2013.01); *H04N 21/4394* (2013.01); *H04N 21/4425* (2013.01); *H04N 21/472* (2013.01); *H04N 21/615* (2013.01); *H04N 21/8126* (2013.01); *H04N 21/84* (2013.01)

(56) References Cited

U.S. PATENT DOCUMENTS

| | | | | |
|---|---|---|---|---|
| 2010/0066919 | A1* | 3/2010 | Nakajima .............. | H04B 1/205 348/734 |
| 2010/0110294 | A1* | 5/2010 | Oka ................... | H04N 5/44591 348/564 |
| 2010/0188567 | A1* | 7/2010 | Ichimura ................ | G09G 5/006 348/441 |
| 2013/0250180 | A1* | 9/2013 | Wang ....................... | H04N 5/44 348/720 |
| 2014/0176804 | A1* | 6/2014 | Toba ................ | H04N 21/43615 348/723 |
| 2015/0042887 | A1* | 2/2015 | Schanin ........... | H04N 21/43635 348/706 |

FOREIGN PATENT DOCUMENTS

| | | |
|---|---|---|
| KR | 10-2011-0085606 | 7/2011 |
| KR | 10-2014-0007698 | 1/2014 |

OTHER PUBLICATIONS

PCT International Application No. PCT/KR2015/002342, International Search Report dated Jun. 4, 2015, 4 pages.

* cited by examiner

【Fig. 1】
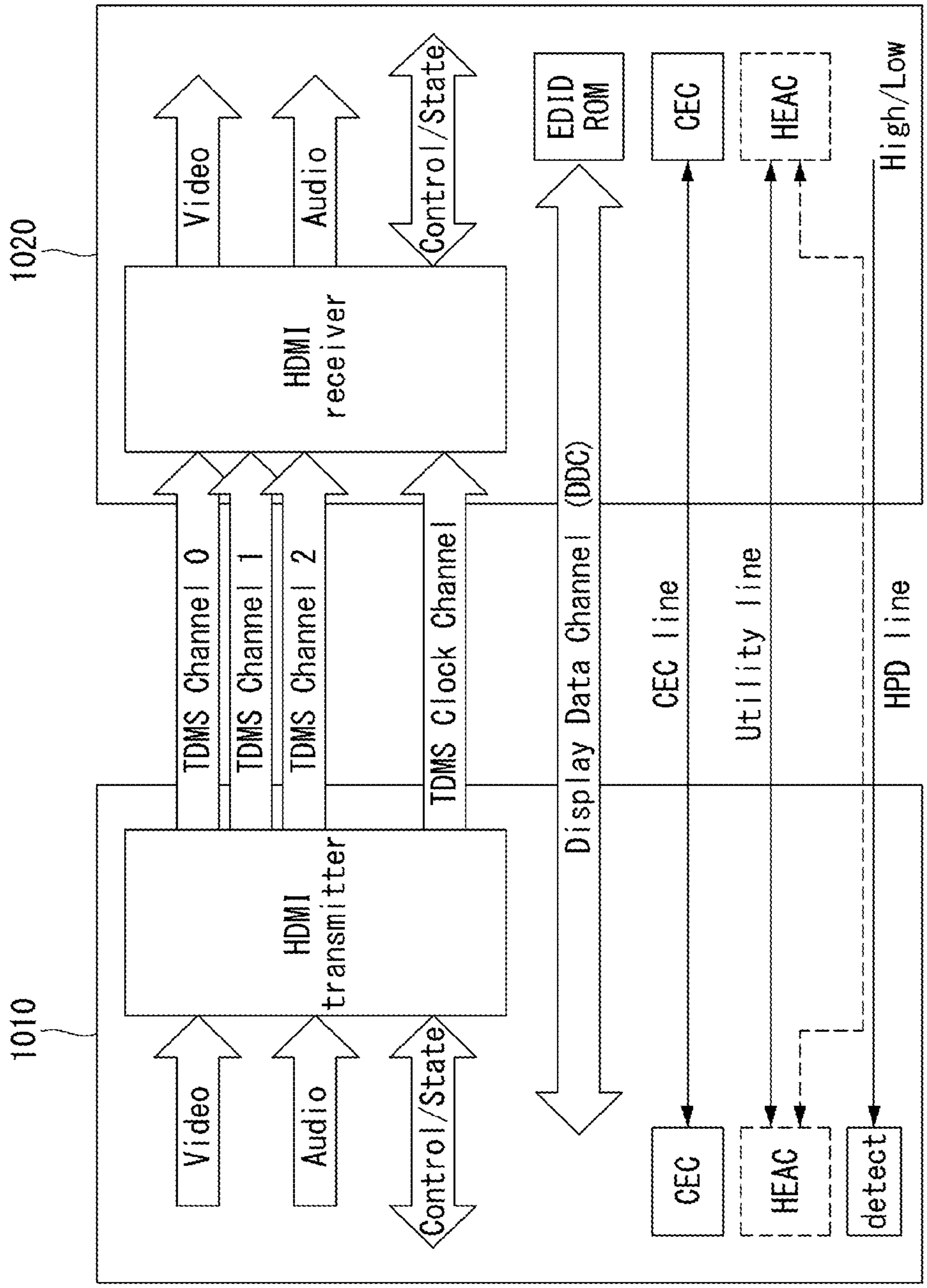

【Fig. 2】
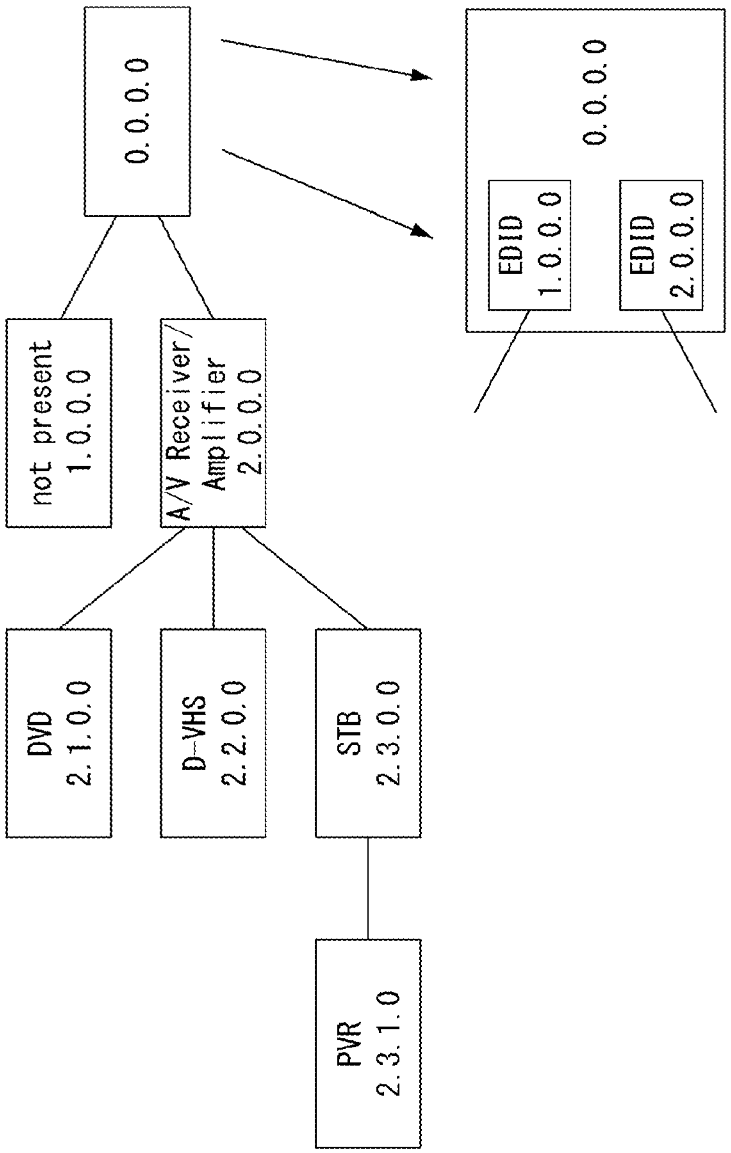

【Fig. 3】
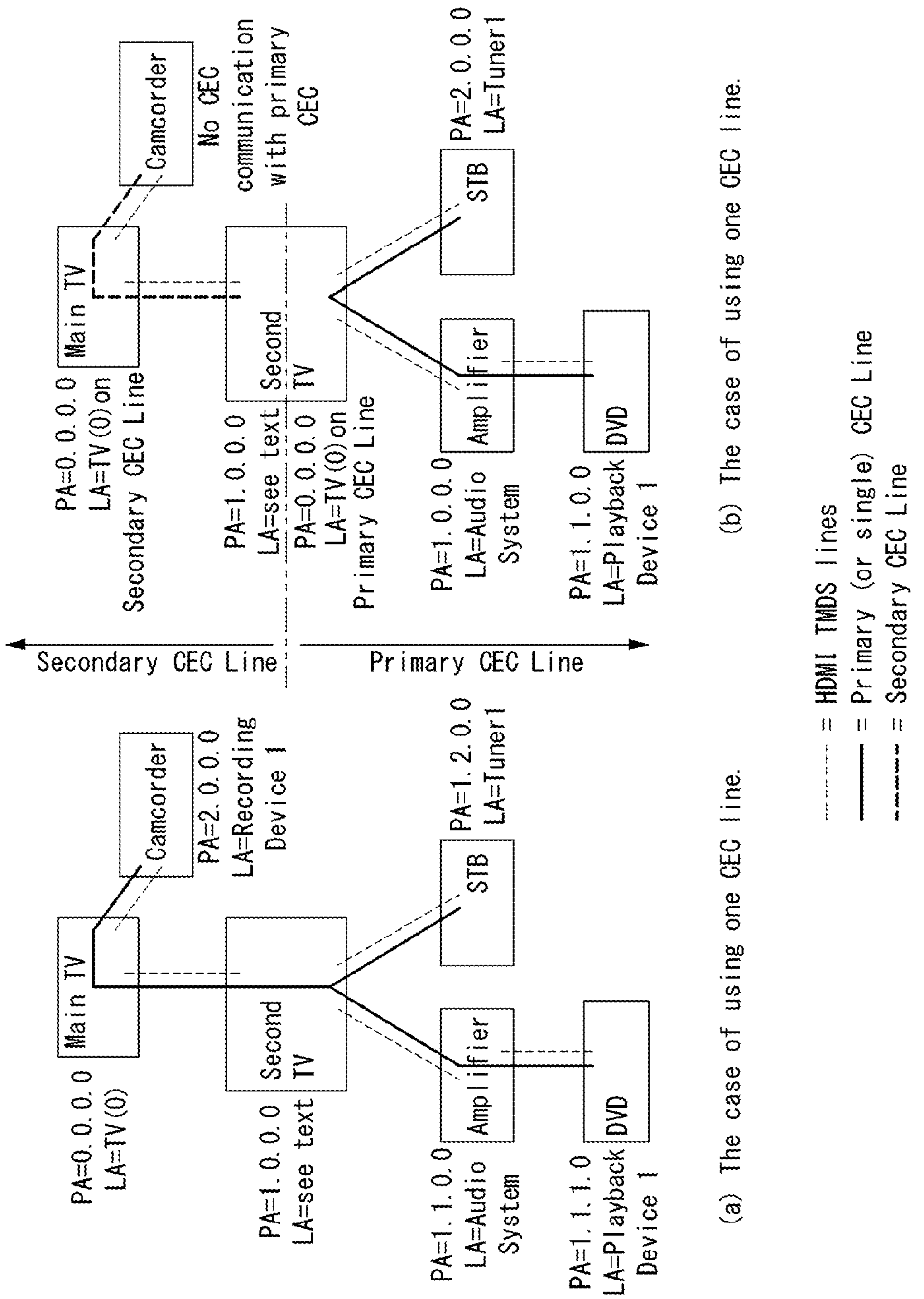

【Fig. 4】

| Header/Data Block | | | | | | | | | |
|---|---|---|---|---|---|---|---|---|---|
| 7 | 6 | 5 | 4 | 3 | 2 | 1 | 0 | - | - |
| Information bits | | | | | | | | EOM | ACK |

【Fig. 5】
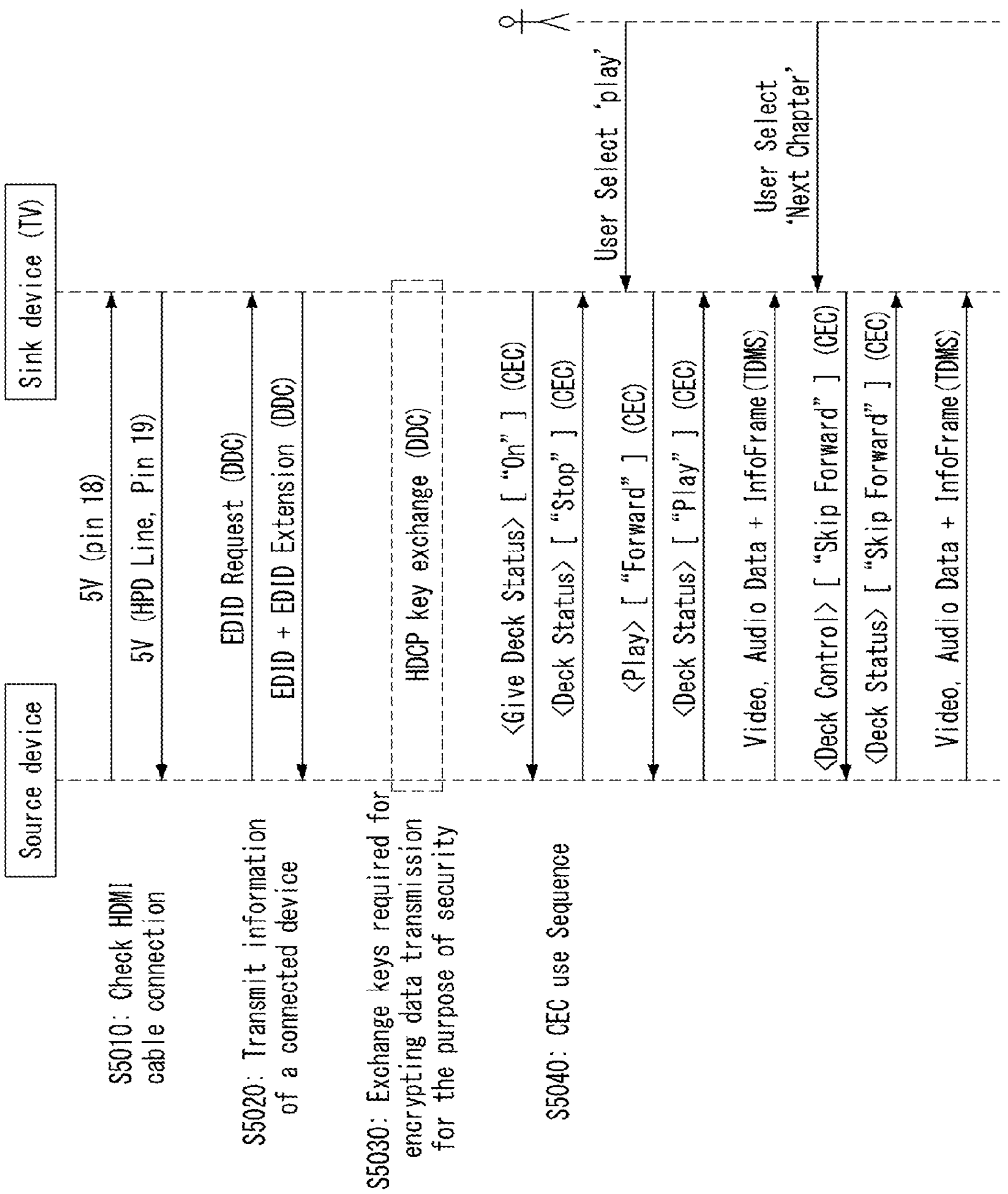

【Fig. 6】

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

【Fig. 7】
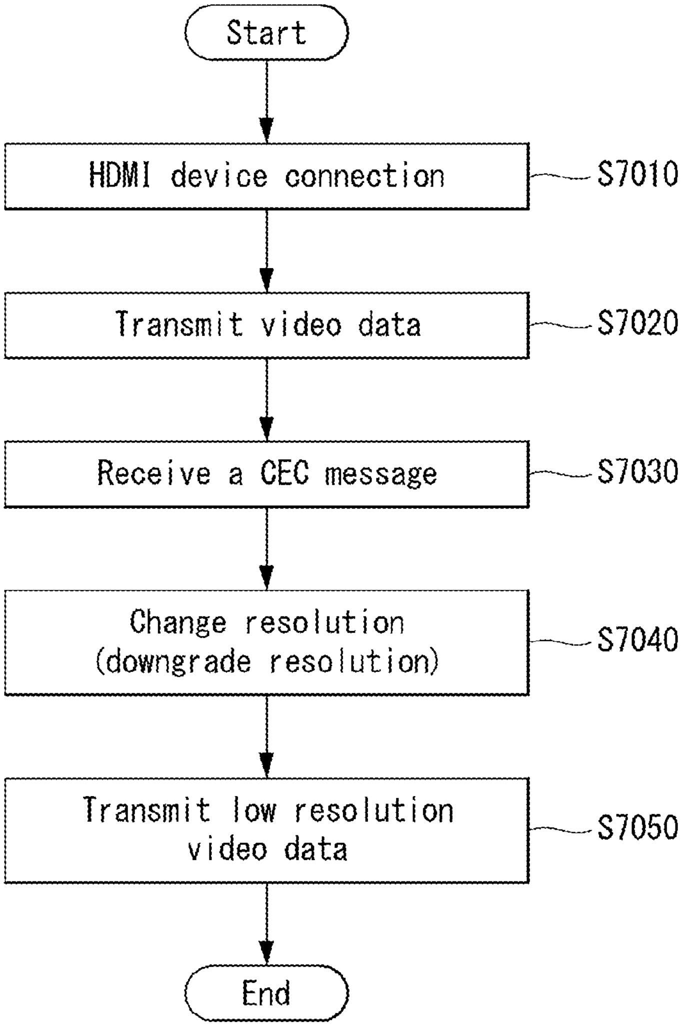

【Fig. 8】
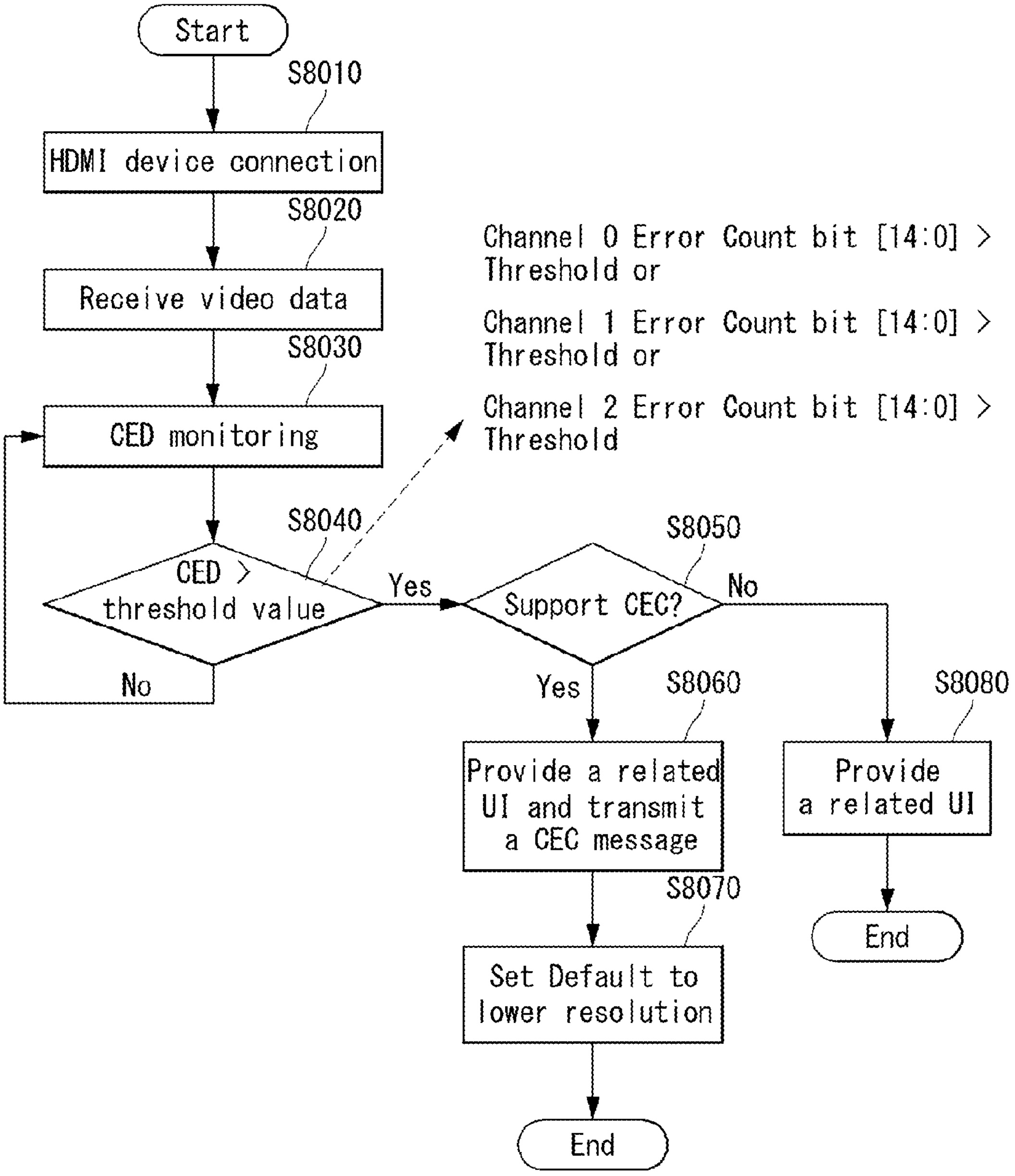

【Fig. 9】
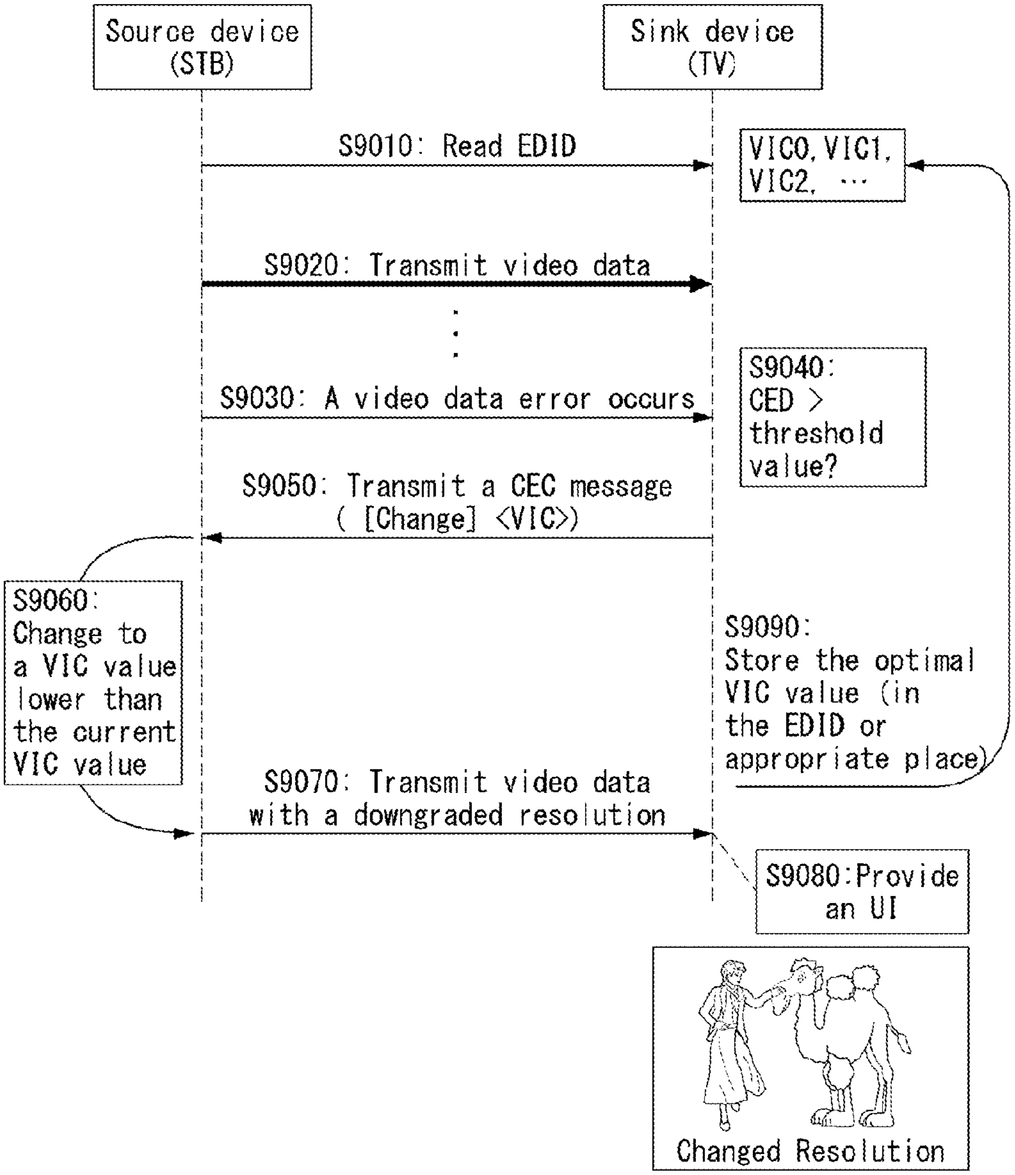

【Fig. 10】
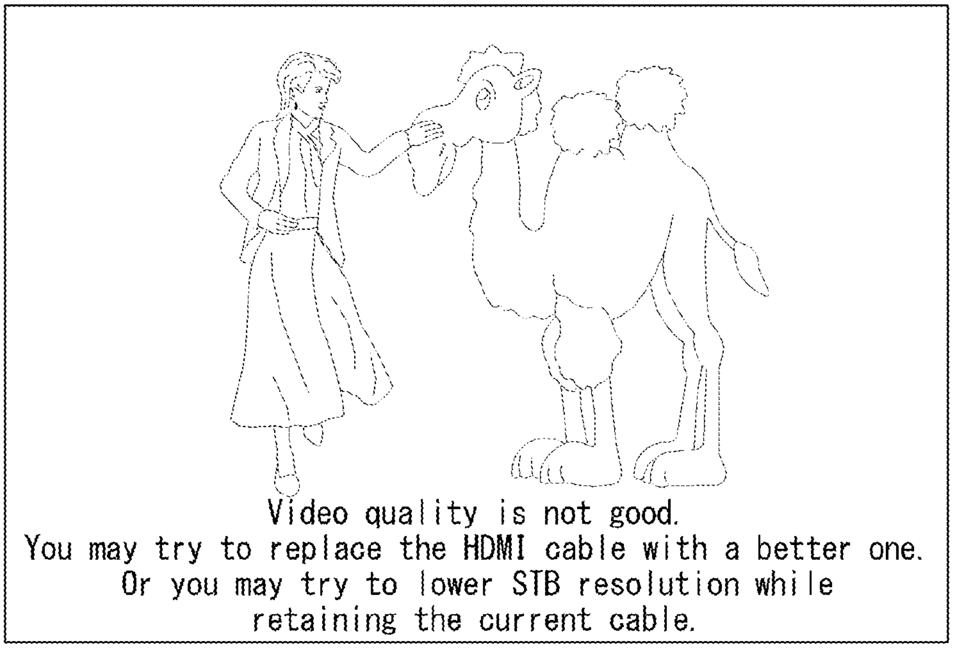
TV UI example

【Fig. 11】

(a) Operator

| Opcode | value | Description | Parameters | Parameter Description | Response | Addressing | | mandatory | |
|---|---|---|---|---|---|---|---|---|---|
| | | | | | | Direct | Broadcast | Initiator | Follower |
| <Change Resolution> | | Request Video Resolution Change Form Sink | [VIC] | Display Resolution ID(Video Identification Code) | <Changed Resolution> | ○ | | | |
| <Changed Resolution> | | Confirm Video Resolution Change From Source | | | | ○ | | | |

(b) Operand

| Name | Range Description | Length | Purpose |
|---|---|---|---|
| [VIC] | 1-128 | 1 byte | If the source device receives a command from the sink device, resolution is changed from a VIC value that can be supported to a lower VIC value. |
| | | | |
| | | | |

【Fig. 12】

| VIC | Formats | Field Rate[5] | Picture Aspect Ratio(H:V)[1] | Pixel Aspect Ratio(H:V) |
|---|---|---|---|---|
| 1 | 640x480p | 59.94Hz/60Hz | 4:3 | 1:1 |
| 2 | 720x480p | 59.94Hz/60Hz | 4:3 | 8:9 |
| 3 | 720x480p | 59.94Hz/60Hz | 16:9 | 32:27 |
| 4 | 1280x720p | 59.94Hz/60Hz | 16:9 | 1:1 |
| 5 | 1920x1080i | 59.94Hz/60Hz | 16:9 | 1:1 |
| 6 | 720(1440)x480i | 59.94Hz/60Hz | 4:3 | 8:9 |
| 7 | 720(1440)x480i | 59.94Hz/60Hz | 16:9 | 32:27 |
| 8 | 720(1440)x240p | 59.94Hz/60Hz | 4:3 | 4:9 |
| 9 | 720(1440)x240p | 59.94Hz/60Hz | 16:9 | 16:27 |
| 10 | 2880x480i | 59.94Hz/60Hz | 4:3 | 2:9 - 20:9[2] |
| 11 | 2880x480i | 59.94Hz/60Hz | 16:9 | 8:27 - 80:27[2] |
| 12 | 2880x240p | 59.94Hz/60Hz | 4:3 | 1:9 - 10:9[2] |
| 13 | 2880x240p | 59.94Hz/60Hz | 16:9 | 4:27 - 40:27[2] |
| 14 | 1440x480p | 59.94Hz/60Hz | 4:3 | 4:9 or 8:9[3] |
| 15 | 1440x480p | 59.94Hz/60Hz | 16:9 | 16:27 or 32:27[3] |
| 16 | 1920x1080p | 59.94Hz/60Hz | 16:9 | 1:1 |
| 17 | 720x576p | 50Hz | 4:3 | 16:15 |
| 18 | 720x576p | 50Hz | 16:9 | 64:45 |
| 19 | 1280x720p | 50Hz | 16:9 | 1:1 |
| 20 | 1920x1080i | 50Hz | 16:9 | 1:1 |
| 21 | 720(1440)x576i | 50Hz | 4:3 | 16:15 |
| 22 | 720(1440)x576i | 50Hz | 16:9 | 64:45 |
| 23 | 720(1440)x288p | 50Hz | 4:3 | 8:15 |
| 24 | 720(1440)x288p | 50Hz | 16:9 | 32:45 |
| 25 | 2880x576i | 50Hz | 4:3 | 2:15 - 20:15[2] |
| 26 | 2880x576i | 50Hz | 16:9 | 16:45-160:45[2] |
| 27 | 2880x288p | 50Hz | 4:3 | 1:15 - 10:15[2] |
| 28 | 2880x288p | 50Hz | 16:9 | 8:45 - 80:45[2] |
| 29 | 1440x576p | 50Hz | 4:3 | 8:15 or 16:15[3] |
| 30 | 1440x576p | 50Hz | 16:9 | 32:45 or 64:45[3] |
| 31 | 1920x1080p | 50Hz | 16:9 | 1:1 |
| 32 | 1920x1080p | 23.98Hz/24Hz | 16:9 | 1:1 |
| 33 | 1920x1080p | 25Hz | 16:9 | 1:1 |
| 34 | 1920x1080p | 29.97Hz/30Hz | 16:9 | 1:1 |
| 35 | 2880x480p | 59.94Hz/60Hz | 4:3 | 2:9, 4:9, or8:9[4] |
| 36 | 2880x480p | 59.94Hz/60Hz | 16:9 | 8:27, 16:27, or32:27[4] |
| 37 | 2880x576p | 50Hz | 4:3 | 4:15, 8:15, or16:15[4] |
| 38 | 2880x576p | 50Hz | 16:9 | 16:45, 32:45, or64:45[4] |
| 39 | 1920x1080i(1250 total) | 50Hz | 16:9 | 1:1 |

【Fig. 13】

| VIC | Formats | Field Rate[5] | Picture Aspect Ratio(H:V)[1] | Pixel Aspect Ratio(H:V) |
|---|---|---|---|---|
| 40 | 1920x1080i | 100Hz | 16:9 | 1:1 |
| 41 | 1280x720p | 100Hz | 16:9 | 1:1 |
| 42 | 720x576p | 100Hz | 4:3 | 16:15 |
| 43 | 720x576p | 100Hz | 16:9 | 64:45 |
| 44 | 720(1440)x576i | 100Hz | 4:3 | 16:15 |
| 45 | 720(1440)x576i | 100Hz | 16:9 | 64:45 |
| 46 | 1920x1080i | 119.88/120Hz | 16:9 | 1:1 |
| 47 | 1280x720p | 119.88/120Hz | 16:9 | 1:1 |
| 48 | 720x480p | 119.88/120Hz | 4:3 | 8:9 |
| 49 | 720x480p | 119.88/120Hz | 16:9 | 32:27 |
| 50 | 720(1440)x480i | 119.88/120Hz | 4:3 | 8:9 |
| 51 | 720(1440)x480i | 119.88/120Hz | 16:9 | 32:27 |
| 52 | 720x576p | 200Hz | 4:3 | 16:15 |
| 53 | 720x576p | 200Hz | 16:9 | 64:45 |
| 54 | 720(1440)x576i | 200Hz | 4:3 | 16:15 |
| 55 | 720(1440)x576i | 200Hz | 16:9 | 64:45 |
| 56 | 720x480p | 239.76/240Hz | 4:3 | 8:9 |
| 57 | 720x480p | 239.76/240Hz | 16:9 | 32:27 |
| 58 | 720(1440)x480i | 239.76/240Hz | 4:3 | 8:9 |
| 59 | 720(1440)x480i | 239.76/240Hz | 16:9 | 32.27 |
| 60 | 1280x720p | 23.98Hz/24Hz | 16:9 | 1:1 |
| 61 | 1280x720p | 25Hz | 16:9 | 1:1 |
| 62 | 1280x720p | 29.97Hz/30Hz | 16:9 | 1:1 |
| 63 | 1920x1080p | 119.88/120Hz | 16:9 | 1:1 |
| 64 | 1920x1080p | 100Hz | 16:9 | 1:1 |

【Fig. 14】

| VIC | Formats | Field Rate[5] | Picture Aspect Ratio(H:V)[1] | Pixel Aspect Ratio(H:V) |
|---|---|---|---|---|
| 65 | 1280x720p | 23.98Hz/24Hz | 64:27[6] | 4:3 |
| 66 | 1280x720p | 25Hz | 64:27[6] | 4:3 |
| 67 | 1280x720p | 29.97Hz/30Hz | 64:27[6] | 4:3 |
| 68 | 1280x720p | 50Hz | 64:27[6] | 4:3 |
| 69 | 1280x720p | 59.94Hz/60Hz | 64:27[6] | 4:3 |
| 70 | 1280x720p | 100Hz | 64:27[6] | 4:3 |
| 71 | 1280x720p | 119.88/120Hz | 64:27[6] | 4:3 |
| 72 | 1920x1080p | 23.98Hz/24Hz | 64:27[6] | 4:3 |
| 73 | 1920x1080p | 25Hz | 64:27[6] | 4:3 |
| 74 | 1920x1080p | 29.97Hz/30Hz | 64:27[6] | 4:3 |
| 75 | 1920x1080p | 50Hz | 64:27[6] | 4:3 |
| 76 | 1920x1080p | 59.94Hz/60Hz | 64:27[6] | 4:3 |
| 77 | 1920x1080p | 100Hz | 64:27[6] | 4:3 |
| 78 | 1920x1080p | 119.88/120Hz | 64:27[6] | 4:3 |
| 79 | 1680x720p | 23.98Hz/24Hz | 64:27[6] | 64:63 |
| 80 | 1680x720p | 25Hz | 64:27[6] | 64:63 |
| 81 | 1680x720p | 29.97Hz/30Hz | 64:27[6] | 64:63 |
| 82 | 1680x720p | 50Hz | 64:27[6] | 64:63 |
| 83 | 1680x720p | 59.94Hz/60Hz | 64:27[6] | 64:63 |
| 84 | 1680x720p | 100Hz | 64:27[6] | 64:63 |
| 85 | 1680x720p | 119.88/120Hz | 64:27[6] | 64:63 |
| 86 | 2560x1080p | 23.98Hz/24Hz | 64:27[6] | 1:1 |
| 87 | 2560x1080p | 25Hz | 64:27[6] | 1:1 |
| 88 | 2560x1080p | 29.97Hz/30Hz | 64:27[6] | 1:1 |
| 89 | 2560x1080p | 50Hz | 64:27[6] | 1:1 |
| 90 | 2560x1080p | 59.94Hz/60Hz | 64:27[6] | 1:1 |
| 91 | 2560x1080p | 100Hz | 64:27[6] | 1:1 |
| 92 | 2560x1080p | 119.88/120Hz | 64:27[6] | 1:1 |

【Fig. 15】

| VIC | Formats | Field Rate[5] | Picture Aspect Ratio(H:V)[1] | Pixel Aspect Ratio(H:V) |
|---|---|---|---|---|
| 93 | 3840x2160p | 23.98Hz/24Hz | 16:9 | 1:1 |
| 94 | 3840x2160p | 25Hz | 16:9 | 1:1 |
| 95 | 3840x2160p | 29.97Hz/30Hz | 16:9 | 1:1 |
| 96 | 3840x2160p | 50Hz | 16:9 | 1:1 |
| 97 | 3840x2160p | 59.94Hz/60Hz | 16:9 | 1:1 |
| 98 | 4096x2160p | 23.98Hz/24Hz | 256:135 | 1:1 |
| 99 | 4096x2160p | 25Hz | 256:135 | 1:1 |
| 100 | 4096x2160p | 29.97Hz/30Hz | 256:135 | 1:1 |
| 101 | 4096x2160p | 50Hz | 256:135 | 1:1 |
| 102 | 4096x2160p | 59.94Hz/60Hz | 256:135 | 1:1 |
| 103 | 3840x2160p | 23.98Hz/24Hz | 64:27[6] | 4:3 |
| 104 | 3840x2160p | 25Hz | 64:27[6] | 4:3 |
| 105 | 3840x2160p | 29.97Hz/30Hz | 64:27[6] | 4:3 |
| 106 | 3840x2160p | 50Hz | 64:27[6] | 4:3 |
| 107 | 3840x2160p | 59.94Hz/60Hz | 64:27[6] | 4:3 |
| 108~255 | Reserved for the Future | | | |
| 0 | No Video Identification Code Available(Used with AVI InfoFrame only) | | | |

DEVICES AND METHODS FOR TRANSMITTING AND RECEIVING DATA OF A SINK DEVICE TO CHANGE VIDEO DISPLAY RESOLUTION BASED ON ERROR COUNTER VALUE DETECTED AT THE SINK DEVICE USING HDMI

CROSS-REFERENCE TO RELATED APPLICATIONS

This application is the National Stage filing under 35 U.S.C. 371 of International Application No. PCT/KR2015/002342, filed on Mar. 11, 2015, which claims the benefit of U.S. Provisional Application No. 61/952,109, filed on Mar. 12, 2014, the contents of which are all hereby incorporated by reference herein in their entirety.

TECHNICAL FIELD

The present invention is related to a device and a method for transmitting and receiving data using HDMI (High Definition Multimedia Interface) and more specifically, a device and a method for transmitting and receiving data using HDMI which controls resolution of display content by using HDMI-CEC (Consumer Electronics Control) protocol or deals with an transmission and reception error of an HDMI cable.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

INVENTION CONTENT

Technical Problem

Due to the upgrade of the HDMI standard and cables, transmission efficiency for transmitting and receiving data through HDMI has been improved significantly. For example, compared to the prior art, it is now possible to transmit video data with very high resolution and multi-channel audio data. However, in case high resolution video data are transmitted beyond communication capacity supported by an HDMI cable, a data transmission and reception error due to the lacking capacity of the HDMI cable might occur. Similarly, a data transmission and reception error might occur from the problems inherent to the HDMI cable. However, for all the cases above, the user is unable to figure out which causes a current problem: a sink device, a source device, data itself, or the HDMI cable.

Technical Solution

To solve the technical problem above, a method for transmitting and receiving data of an HDMI sink device according to the present invention comprises receiving video data through at least one channel of HDMI from a source device; generating an error counter value by performing CED (Character Error Detection) on the received video data; in case the error counter value exceeds a threshold value, transmitting to the source device a CEC message requesting resolution change of the video data; and receiving video data with a resolution changed according to the CEC message from the source device.

Also, a method for transmitting and receiving data of an HDMI sink device according to the present invention further comprises mapping the error counter value to SCDC (Status and Control Data Channel) data. Also, in a method for transmitting and receiving data of an HDMI sink device according to the present invention, the CEC message can include VIC (Video Identification Code) information that indicates changed resolution of the video data.

Also, a method for transmitting and receiving data of an HDMI sink device according to the present invention further comprises generating an error counter value by performing CED (Character Error Detection) on the video data of changed resolution and storing VIC information of the video data in case no error is detected with respect to the video data of changed resolution.

Also, a method for transmitting and receiving data of an HDMI sink device according to the present invention further comprises displaying an UI including a message suggesting replacement of an HDMI cable or downgrading video resolution in case the error counter value exceeds a threshold value.

To solve the technical problem above, a sink device transmitting and receiving data by using HDMI according to the present invention comprises an HDMI receiver transmitting and receiving audio/video data through HDMI; and a controller controlling data transmission and reception of the HDMI receiver, wherein the sink device receives video data from the source device through at least one channel of HDMI, generates an error counter value by performing CED (Character Error Detection) on the received video data, transmits to the source device a CEC message requesting resolution change of the video data in case the error counter value exceeds a threshold value, and receives from the source device video data with the resolution changed according to the CEC message.

Also, to solve the technical problem above, a method for transmitting and receiving data of a source device by using HDMI according to the present invention comprises obtaining information about video resolution that a sink device can support by reading EDID (Extended Display Identification Data) of the sink device; transmitting video data to the sink device according to the video resolution information; receiving from the sink device a CEC message requesting change of resolution of the video data; and transmitting video data with the resolution changed according to the CEC message.

Also, in a method for transmitting and receiving data of a source device by using HDMI according to the present invention, the CEC message can further include VIC (Video Identification Code) information indicating changed resolution of video data, and the resolution of video data changed according to the CEC message is a downgraded resolution.

Also, a method for transmitting and receiving data of a source device by using HDMI according to the present invention further comprises reading a CED (Character Error Detection) error counter value with respect to the transmitted video data from SCDC (Status and Control Data Channel) of the sink device.

To solve the technical problem above, a source device transmitting and receiving data by using HDMI according to the present invention comprises an HDMI transmitter transmitting and receiving data through HDMI; and a controller controlling data transmission and reception of the HDMI transmitter, wherein the source device obtains information about video resolution that a sink device can support by reading EDID (Extended Display Identification Data) of the sink device; transmits video data to the sink device according to the video resolution information; receives from the sink device a CEC message requesting change of resolution of the video data; and transmits video data with the resolution changed according to the CEC message.

Advantageous Effect

According to the present invention, a data error during transmission and reception through an HDMI cable can be detected.

Also, according to the present invention, a source device can figure out a data transmission and reception error by mapping a CED (Character Error Detection) counter value to an SCDC (Status and Control Data Channel).

Also, according to the present invention, in case a CED counter value exceeds a predetermined threshold value, a transmission and reception video data error can be reduced or avoided by changing/downgrading resolution of transmitted and received video data.

Also, according to the present invention, in the event of an HDMI cable fault, by providing the user with a message suggesting replacement of the HDMI cable as well as performing change of resolution of video data, the user can be duly informed of the fault so that the user can be guided to replace the HDMI cable.

Also, according to the present invention, in case no data error is detected as video resolution is downgraded, the corresponding resolution setting is stored so that a video data error can be prevented when a sink device is operated afterwards.

[도면의 간단한 설명]

FIG. 1 illustrates an HDMI system according to one embodiment of the present invention and data transmission and reception channels included in the HDMI system.

FIG. 2 illustrates devices of an HDMI system according to one embodiment of the present invention and physical addresses assigned to the devices.

FIG. 3 illustrates devices of another HDMI system according to one embodiment of the present invention and logical addresses assigned to the devices.

FIG. 4 illustrates a header/data block as an HDMI CEC data format according to an embodiment of the present invention.

FIG. 5 illustrates an HDMI CEC sequence according to an embodiment of the present invention.

FIG. 6 illustrates an SCDC structure according to an embodiment of the present invention.

FIG. 7 illustrates a method for changing resolution of video data transmitted from a source device according to one embodiment of the present invention.

FIG. 8 illustrates a method for checking an error in the video data received by a sink device and accordingly changing resolution of the received video data according to one embodiment of the present invention.

FIG. 9 is a flow diagram illustrating a method for adjusting video resolution of HDMI devices according to an embodiment of the present invention.

FIG. 10 illustrates an UI according to an embodiment of the present invention.

FIG. 11 illustrates a CEC message according to an embodiment of the present invention.

FIGS. 12 to 15 illustrate a VIC table according to an embodiment of the present invention.

BEST MODE FOR INVENTION

In what follows, preferred embodiments of the present invention will be described in detail with reference to appended drawings. Detailed descriptions given below with reference to appended drawings are not limited only to those embodiments that can be realized according to the embodiments of the present invention, but they are intended to describe preferred embodiments of the present invention. The following descriptions include specific details to provide thorough understanding of the present invention. However, it should be clearly understood by those skilled in the art that the present invention can be implemented without employing the specific details.

Most terms used in this document are used widely in the corresponding technical field, but part of the terms have been chosen arbitrarily by the applicant, of which the meaning will be described in detail in the following description depending on the needs. Therefore, the present invention should be understood by the intended meaning of used terms rather than their apparent names or immediate implication.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and a cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

Though illustrated briefly in FIG. 1, a source device 1010 can include an HDMI transmitter transmitting and receiving data through HDMI; and a controller controlling the HDMI transmitter and data communication through HDMI of the source device. Also, the sink device 1020 can include an HDMI receiver transmitting and receiving data through HDMI; and a controller controlling the HDMI receiver and data communication through HDMI of the sink device.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data. These channels can be used to deliver video data, audio data, and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel).

A utility line can be used for an optional extension function such as HEAC.

CEC (Consumer Electronics Control) specifies interoperability between devices within the HDMI system and can include various features that reinforce functionality of the devices. By using the HDMI-CEC protocol, the user can control a source device connected to a sink device through HDMI as well as the sink device itself by using a control device of the sink device (for example, remote controller). In what follows, the HDMI-CEC protocol will be described in more detail.

Table 1 and 2 below illustrate the structure/features that the HDMI-CEC protocol provides.

Table 1 illustrates an end-user structure/features that the HDMI-CEC protocol provides.

【표 1】

| | |
|---|---|
| One Touch Play | Video play is started by one click of a button, and device is switched to an active source state. |
| System Standby | All of the connected devices are switched to a waiting mode. |
| One Touch Record | Control the function of recording a program played in TV |
| Timer Programming | Set up the timer of a different device from one device |
| Deck Control | Control a play device from a different device |
| Tuner Control | Control the tuner of a different device |
| Device Menu Control | Make menus of a device controlled by using a TV remote controller |
| Remote Control Pass Through | Transmit the command received from the remote controller to a different device |
| System Audio Control | Transmit a command that controls audio play |

Table 2 illustrates a structure/features that the HDMI-CEC protocol supports.

【표 2】

| | |
|---|---|
| Device OSD Name Transfer | Transmit a configured device name to a TV set |
| Device Power Status | Check the current power status of a device |
| OSD Display | Transmit text from a device to display the text on the screen of a TV set |
| Routing Control | Control routing of an HDMI network when a CEC switch is used |
| System Information | Set by a device to use the same OSD and menu language as the TV. |

-continued

【표 2】

| | |
|---|---|
| Vendor Specific Commands | Commands defined by a vendor |
| Audio Rate Control | Move an audio source slightly forward or backward |
| Audio Return Channel Control | Used to control Audio Return Channel (ARC) |
| Capability Discovery and Control | Used to control HDMI Ethernet Channel (HEC) |

Devices of the HDMI system have physical addresses to perform addressing specific physical devices and to control switching by using the HDMI-CEC protocol. A physical address is determined by a physical address recovery operation, and the sink device can generate and utilize a unique physical address comprising 4 numbers, each of which consisting of 4 bits (n.n.n.n). In addition, CEC-enabled devices can have logical addresses according to their respective features.

In what follows, related to the HDMI CEC protocol, terms such as initiator and follower can be used in addition to the terms of source device and sink device. An initiator is a device that has transmitted or transmits a CEC message and depending on situations, indicates a device waiting for a response from a follower while the follower is a device that has received a CEC message and indicates a device that has to respond to the received message.

FIG. 2 illustrates devices of an HDMI system according to one embodiment of the present invention and physical addresses assigned to the devices.

A physical address may refer to the address system for indicating positions of devices used on the CEC bus. As described in detail above, a physical address can comprise four number, each of which consists of 4 bits (n.n.n.n), and a source device can check the physical address through EDID (Extended Display Identification Data) of a sink device.

As shown in FIG. 2, a device operating as a CEC root device such as the sink device or repeater can have a physical address as 0.0.0.0. A sink device can generate physical addresses for individual source devices by assigning port numbers to the unique physical addresses of connected source devices and set the generated address values to the EDID of the corresponding ports. In other words, if a new device is connected, the sink device can assign an address to the source device through CEA (Consumer Electronics Association) extension of the E-EDID (Enhanced EDID).

FIG. 3 illustrates devices of another HDMI system according to one embodiment of the present invention and logical addresses assigned to the devices.

As described with reference to FIG. 2, in case a new physical address is found as a device is connected to the HDMI system, and the connected device supports the CEC, the sink device can assign a logical address to the connected device. The assigned logical address can be used as a source address and a destination address when a CEC message is transmitted.

Table 3 illustrates an embodiment of a logical address assigned according to the features of a device.

【표 3】

| Logical address | Device |
|---|---|
| 0 | TV |
| 1 | Recording device 1 (Recording Device 1) |
| 2 | Recording device 2 (Recording Device 1) |
| 3 | Tuner 1 |
| 4 | Playback device 1 (Playback Device 1) |
| 5 | Audio system |
| 6 | Tuner 2 |
| 7 | Tuner 3 |
| 8 | Playback device 2 |
| 9 | Recording device 3 |
| 10 | Tuner 4 |
| 11 | Playback device 3 |
| 12 | Back-up 1 (For device types of "playback devices o"recording device of"tunerding de"processor devn case all of the specified logical addresses are assigned) |
| 13 | Back-up 2 (For device types of "playback device", "recording device", "tuner", and "processor", in case all of the specified logical addresses are assigned) |
| 14 | Specific Use |
| 15 | Unregistered (Initiator Address)<br>Broadcast (Destination Address) |

In case one CEC line is used as shown in FIG. 3(*a*) and a primary CEC line and a secondary CEC line are used as shown in FIG. 3(*b*), a physical address 0.0.0.0 is assigned to the main TV and a logical address 0 is assigned thereto. And for other connected devices, logical addresses can be assigned according to the types of the connected devices as shown in FIG. 3. The sink device can inform other devices about the assigned logical addresses through broadcasting.

FIG. 4 illustrates a header/data block as an HDMI CEC data format according to an embodiment of the present invention.

The HDMI CEC performs control operations by transmitting and receiving a CEC message through a CEC line. The data by which the CEC messages are transmitted can be transmitted and received in the form of a frame format.

A CEC frame can include a start bit, header block, and at least one optional data block. As an embodiment, size of one block can be 10 bit, and size of the maximum message can be 16*10 bit (excluding the start bit). Table 4 provides a brief description of the blocks included in the CEC frame.

【표 4】

| Name | Description |
|---|---|
| Start | Special start 'biti |
| Header Block | Source and Destination addresses; Logical Address |
| Data Block 1(opcode block) | Opcode (optional) |
| Data Block 2(operand blocks) | Operand(s) specific to opcode (optional, depending on opcode) |

All of the head blocks and data blocks have 10 bit-length and can have a basic structure which is the same as shown in FIG. 4. As shown in FIG. 4, the information bits field can be data, opcode, or address. Control bits such as EOM and ACK can always be defined within a block and used in the same way. In the case of the header block, the information bits can include a logical address (4 bits) of an initiator and a logical address (4 bits) of a target device. The data block follows subsequent to the header block, and data such as operands can be transmitted after the opcode is transmitted.

The EOM (End of Message) bit indicates whether the corresponding block is the last one or a succeeding data block exists. As an example, in case there is a succeeding data block, the EOM bit can be set to 0 while a message is completed in the corresponding data block, the EOM can be set to 1.

The ACK (Acknowledge) bit can be used for a follower to check reception of data or a header block. As an example, reception of data or a header block can be checked by the initiator's sending the ACK bit by setting it to 1 and the follower's setting it to 0.

An opcode (operation code) is part of machine commands and describes an operation that has to be performed. In other words, an opcode is used as a name to identify a CEC message and can have a unique identifier/value. In addition to opcodes, commands can have the corresponding data values in the form of operands.

In other words, an operator represents a CEC command, an opcode represents a name to identify a CEC message, and an operand represents data values corresponding to the CEC command/message. In particular, an operand can correspond to the data specific to a particular opcode.

FIG. 5 illustrates an HDMI CEC sequence according to an embodiment of the present invention.

First, the source device and the sink device can check HDMI cable connection S5010. As shown in FIG. 5, if it is checked that 5V is applied to pin 18 of the source device, and 5V is applied to pin 19 (HPD) of the sink device, it can be determined that an HDMI cable has been connected between the source device and the sink device.

And the source device and the sink device can transmit/receive information of connected devices S5020. As shown in FIG. 5, by transmitting an EDID (Enhanced Display Identification Data) request to the sink device through a DDC (Display Data Channel) and receiving EDID information and EDID extension information from the sink device, the source device can read the EDID of the sink device.

Next, the source device and the sink device can exchange keys required for encrypting data transmission for the purpose of security S5030. This step is optional, and the source device and the sink device can exchange HDCP keys through the DDC.

And data transmission status can be controlled through the sequence based on the HDMI CEC protocol according to the command that the user has entered S5040. FIG. 5 is an embodiment in which deck control is performed by using the HDMI CEC protocol.

First, requesting and receiving deck status information, the sink device can check the deck status of the source device. And if the user inputs 'play' through an input device such as a remote controller, a play command (argument: "Forward") can be transmitted to the source device. The source device can recognize the received CEC command and transmit video data and audio data to the sink device. Now, if the user additionally inputs 'Next Chapter', the sink device can transmit a deck control command (argument: "Skip Forward") to the source device, and the source device can recognize this CEC command and transmit video data and audio data of the next chapter to the sink device.

In what follows, described will be a method for controlling video resolution or detecting a transmission and reception error of an HDMI cable by using the HDMI CEC protocol described above. As the resolution of video data supported by a source device and a sink device is increasing gradually, there may be times when an HDMI cable is unable to support high resolution data transmitted and received. To handle such a situation, the present invention proposes a method for suggesting replacement of a cable or decreasing resolution of data transmitted and received.

Meanwhile, the HDMI system can additionally provide a Character Error Detection (CED) function. The sink device can perform CED on received data, monitor the received data for a data error, and in the event of error, maps the error to the error counter in an SCDC register. The CED function provides a mechanism by which the sink device can report the number of character errors that the sink device has detected to the sink device, and the source device can check link quality by sampling the error counter at regular intervals.

While performing CED, the sink device can implement a character error counter for each of TMDS channels 0, 1, and 2. For example, the sink device can check characters coming from a reception channel and if it encounters an error in a character received from the corresponding channel, increase the character error counter related to the channel. The source device can check link quality by reading the error counter of the sink device. The character error detection/counter check between the sink device and the source device can be performed through the SCDC described later.

The error counter value can be maintained for each of the three channels. As an example, each error counter value can have a 15-bit length and be mapped to the register of a SCDC source by using two bytes. The LSB (Least Significant Bit) 8 bits and MSB (Most Significant Bit) 7 bits of the error counter can be assigned to the lower and higher address byte respectively, and the topmost 1 bit of the error counter can be assigned to a "valid" flag.

FIG. 6 illustrates an SCDC structure according to an embodiment of the present invention.

The HDMI 2.0 system newly defines the SCDC (Status and Control Data Channel). SCDC is a system that provides a method for sharing link status information measured in the sink device with the source device and corresponds to a point-to-point communication protocol by which the source device and the sink device exchange data with each other. SCDC communication can use the DDC channel (line I2C) of FIG. 1.

The SCDCS (SCDC Structure) is stored in the memory of the sink device and can include such data as shown in the table of FIG. 6. In FIG. 6, R/W indicates whether the source device can only read or read/write the SCDCS data stored in the sink device.

The fields included in the SCDCS of FIG. 6 are described briefly below.

- Sink Version: provides version information of an SCDCS compliant sink device.
- Source Version: when the SCDCS compliant sink device reads E-EDID from the sink device, and the SCDC_Present of the E-EDID is set to 1, the source version of the SCDCS is set to 1.
- Update Flags (Update_0, Update_1): when there is a change in the information that the sink device has to inform of the source device (Status, Character Error Detect, and so on), the corresponding bit is set to 1.
- TMDS Configuration (TMDS_Config): each of the TMDS_Bit_Clock_Ratio and Scrambling Enable occupies one bit, and if the source device attempts to activate the scrambling function of the sink device, the corresponding bit is set to 1. If the TMDS_Bit_Clock_Ratio is 1/10, this field is set to 0 while it is set to 1 in the case of 1/40.
- Scrambler Status: when the sink device detects a scrambled control code sequence, the corresponding bit is set to 1.
- Configuration (Config_0): this field is used to configure capability-related information of the source and the sink device. Currently, this field provides only the RR_Enable field that indicates whether the source device supports a read request of the sink device.
- Status Flags (Status_Flag_0, Status_Flag_1): indicates whether data received through the clock, channel 0, 1, and 2 have been decoded successfully.
- Err_Det_0~2_L/H: represent the LSB and MSB of the error counter detected in the channel 0 to 3.
- Err_Det_Checksum: is implemented so that one byte sum of error detection values of seven registers including checksum becomes 0.

As described above, values of the fields of which the offset ranges from 0x50 to 0x56 can be updated by CED. The CED_Update flag of the SCDCS can be set to 1 if the sink device detects an error. If the source device reads an error value, the sink device can set the CED_Update flag again to 0. In case the source device reads BER, the sink device does not change the CED_Update field value. The CED flag/field value can be reset when the sink device is powered off or HPD (Hot Plug Detect) switches from the low level to the high level.

FIG. 7 illustrates a method for changing resolution of video data transmitted from a source device according to one embodiment of the present invention.

The source device can check an HDMI cable and connection of a sink device S7010. As an example, the source device may check connection of an HDMI device according to the method described with reference to FIG. 5.

The source device can transmit video data to the sink device through HDMI S7020. At this time, the source device can read EDID of the sink device connected to the source device through HDMI, obtain information of video resolution that the sink device can support, and transmit video data according to the video resolution information. From the video resolution information obtained, the source device can transmit video data with the maximum resolution that the sink device can support.

Receiving a CED message that requests change of video resolution S7030, the source device can change the resolution of output video S7040. According to the CEC message, the source device can increase or decrease video resolution, and a CEC message for changing video resolution according to the present invention will be defined below.

The source device can transmit video data with changed resolution to the sink device S7050. In the present invention, the source device can transmit video data after downgrading the resolution thereof to prevent occurrence of a data error due to HDMI cable capacity.

FIG. 8 illustrates a method for checking an error in the video data received by a sink device and accordingly changing resolution of the received video data according to one embodiment of the present invention.

The sink device can check an HDMI cable and connection of a source device S7020. As an example, the sink device can check connection of an HDMI device according to the method described with reference to FIG. 5.

The sink device can receive video data from the source device S8020 and perform CED monitoring on individual channels receiving video data S8030. As described in detail above, CED monitoring performs CED on the video data received through three individual TMDS channels and generates an error counter value. The error counter value for each channel, namely CED value can be mapped/stored into the SCDC structure/data.

The sink device can determine whether the CED value exceeds a threshold value S8040 by monitoring the CED value S8030, continue video data reception and CED monitoring if the CED value is less than the threshold value, and change video data resolution if the CED value is larger than the threshold value. As described in detail above, a CED value can represent an error counter bit value for each channel. Therefore, the sink device can determine whether the error counter bit value exceeds a predetermined threshold for each of the channel 0 to 2. Therefore, even when an error occurs only in one of the three channels, the sink device can cope with the error.

The CED value can exceed a threshold value when there is a problem in the HDMI cable or high resolution video data that exceed the transmission capacity of the HDMI cable are being transmitted and received. According to an embodiment, the sink device can perform a resolution change procedure when the error counter value exceeds a threshold value for each of the TMDS channels or the total error counter value of the entire TMDS channels exceeds a threshold value.

In case the HDMI or connected devices do not support the CEC protocol, the sink device can provide a related UI (User Interface) S8080. The related UI is an UI provided to the user to suggest replacement of an HDMI cable or downgrade of the resolution, where the UI may be provided in the form of a GUI (Graphical UI) displayed on a screen or a voice UI.

In case the HDMI or connected devices support the CEC protocol, the sink device can provide a related UI and a CEC message for changing video resolution to the source device S8060. And the sink device can set a changed resolution, namely a lower resolution as the default resolution of video data S8070.

FIG. 9 is a flow diagram illustrating a method for adjusting video resolution of HDMI devices according to an embodiment of the present invention.

FIG. 9 illustrates operations of the source device (set-top box) and the sink device (TV) shown in FIGS. 7 and 8, along with additional steps. FIG. 9 does not illustrate the process in which the source device and the sink device are connected to each by HDMI and recognize each other. The embodiments of FIGS. 7 to 9 are complimentary to one another.

The source device can read EDID of the sink device S9010 and figure out structure information of the sink device and available functions thereof. At this time, the video format that the sink device can support can be identified by VIC (Video Identification Code) number/value. For example, the sink device can be recognized as supporting video formats the VIC numbers/values of which range from 1 to 24.

The source device can transmit video data by taking into account the performance of an identified sink device S9020. In other words, the source device can identify the video formats that the sink device can support by using the VIC and transmit video data with the highest resolution allowed for the source device. For example, if the highest resolution that the sink device can support is 1920×1080p at 50 Hz, where VIC is 31, and the highest resolution that the source device can support is also 19020×1080p at 50 Hz, where VIC is 31, the video data can be transmitted at that resolution. However, if the highest resolution that the sink device can support is 1920×1080p at 50 Hz, where VIC is 31, and the highest resolution that the source device can support is 1280×720p at 100 Hz, where VIC is 40, the video data with the VIC of 40 may be transmitted.

If an error occurs in the video data transmitted from the source device to the sink device S9030, the sink device can check the error by performing the CED function and increase the CED value. In other words, the sink device can generate a CED value by performing CED on the received video data and monitor whether the CED value exceeds a threshold value while increasing the CED value in the event of error S9040. Error detection through the CED function and storing and reading the error value can be performed in the same way as described in detail above.

In case the CED value exceeds a threshold value, the sink device can transmit a CEC message requesting change of video resolution, and the source device can receive the CEC message S9050. The CEC message requesting change of video data resolution can include VIC information, by which video data resolution to be changed can be identified, and descriptions about the CEC message will be given later.

Receiving a CEC message, the source device can change the resolution of output video data from the resolution of a current VIC to the resolution of a lower VIC according to the received CEC message S9060. And the source device can transmit the video data with a downgraded resolution to the sink device S9070. In addition, the source device may inform the sink device about resolution change by transmitting a CEC message confirming that the resolution has been changed.

Receiving video data with a downgraded resolution, the sink device can provide an UI that indicates the reception S9080. As an example, an UI which provides a message indicating change of resolution visually or audibly, where FIG. 9 illustrates an embodiment of displaying such a message on a screen.

The sink device can store the configured resolution and VIC value into the memory together with EDID S9090. This is done so that in case the sink device reboots afterwards, the corresponding VIC value can be provided to the source device, and video data with an optimized resolution can be received/displayed from the start. The sink device can perform CED by receiving video data with a changed resolution, determines that no error has been occurred or an occurred error can be tolerable if the CED value stays below a predetermined threshold value for a predetermined time period, and store the corresponding resolution value (VIC value). The corresponding resolution value (VIC) may be stored in a register of EDID or SCDCS.

Though not shown in FIG. 9, in case the CED value exceeds a threshold value, the sink device may provide an UI informing of corruption of video data as shown in FIG. 8 and suggesting replacement of a cable. If a user input selecting resolution of the video data is received through the UI, the sink device may change resolution of video data that the source device transmits by transmitting resolution information according to the user input to the CEC message.

Also, the sink device can map an error counter value to the SCDC and if the error counter value exceeds a predetermined threshold value, write the error counter value in the SCDCS or transmit a message so that the source device can read the error counter value. In this case, the source device can read the error counter value from the SCDCS of the sink device and if the read value exceeds a threshold value, downgrade the resolution of transmitted video data. In other words, the operation of changing resolution described above is controlled/performed by the source device-side.

FIG. 10 illustrates an UI according to an embodiment of the present invention.

FIG. 10 illustrates an embodiment of a GUI for informing the user about a situation where the sink device recognizes corruption of received video data as described in detail above. In the embodiment of FIG. 10, the GUI provides a message for the user suggesting replacement of an HDMI cable or downgrade of video resolution. In case the user downgrades the video resolution by operating the sink device or a remote controller, the downgrade of video resolution can be transmitted to the source device in the form of a CEC message as described in detail above.

FIG. 11 illustrates a CEC message according to an embodiment of the present invention.

FIG. 11 is an embodiment of CEC messages described in detail above with reference to FIGS. 7 to 10; a CEC message of the present invention is defined as a description about the corresponding operation and is not necessarily defined only according to the same syntax.

First, opcodes and operands defined in the present invention comprising operators of FIG. 11(*a*) will be described.

<Change Resolution>: opcode representing a CEC message/command requesting change of video resolution from the sink device to the source device. Parameters can include a VIC value or can be transmitted together with the VIC value.

<Changed Resolution>: opcode representing a CEC message/command confirming from the source device to the sink device that video resolution has been changed. It can be transmitted or received as a response CEC message of the opcode <Change Resolution>.

Next, operands of FIG. 11(*b*) defined in the present invention will be described.

[VIC]: information of video data transmitted and received, in particular, operand indicating resolution. In an embodiment, VIC comprises 1 byte, and its value can range from 1 to 128. VIC values and definitions about resolutions corresponding to the VIC values are shown in FIGS. 12 to 15.

FIGS. 12 to 15 illustrate a VIC table according to an embodiment of the present invention.

The VIC tables of FIGS. 12 to 15 show format, field rate, picture aspect ratio, and pixel aspect ratio of video data according to individual VIC values. Information of the VIC table may be called VIC information, or VIC value may be called VIC information.

It will be understood by those skilled in the art to which the present invention belongs that the present invention can be modified or changed in various ways without departing from the technical principles or scope of the present invention. Therefore, it is intended that the present invention includes modifications and changes of the present invention provided within the technical scope defined by appended claims and their equivalents.

In this document, the device and the method according to the present invention have been described fully, and descriptions for the device and method can be applied to each other in a complementary manner.

Mode for Invention

Various embodiments are described in Best mode for invention.

INDUSTRIAL APPLICABILITY

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A method for transmitting and receiving data of a sink device by using a High Definition Multimedia Interface (HDMI), the method comprising:

receiving, from a source device, video data through at least one channel of the HDMI;

counting an error counter value regarding the at least one channel of the HDMI by performing Character Error Detection (CED) on the received video data;

when the error counter value is larger than a pre-configured threshold value, transmitting, to the source device, a Consumer Electronics Control (CEC) message requesting to change resolution of the received video data; and receiving, from the source device, another video data with changed resolution according to the CEC message.

2. The method of claim 1, further comprising:

mapping the error counter value to Status and Control Data Channel (SCDC) data.

3. The method of claim 1, wherein the CEC message includes Video Identification Code (VIC) information indicating specific resolution to be changed for the received video data.

4. The method of claim 3, further comprising:

storing VIC information indicating the changed resolution of the another video data, wherein the changed resolution is configured as a default resolution for the source device.

5. The method of claim 3, further comprising:

when the error counter value is larger than the pre-configured threshold value, outputting a User Interface (UI) including a message suggesting replacement of an HDMI cable or downgrading video resolution.

6. A sink device transmitting and receiving data by using a High Definition Multimedia Interface (HDMI), the sink device comprising:

a HDMI receiver transmitting and receiving audio/video data through the HDMI; and a controller controlling data transmission and reception of the HDMI receiver, wherein the sink device is configured to:

receive, from a source device, video data through at least one channel of the HDMI;

count an error counter value regarding the at least one channel of the HDMI by performing Character Error Detection (CED) on the received video data;

when the error counter value is larger than a pre-configured threshold value, transmit, to the source device, a Consumer Electronics Control (CEC) message requesting to change resolution of the received video data; and receive, from the source device, another video data with changed resolution according to the CEC message.

7. The sink device of claim 6, wherein the sink device is configured to map the error counter value to Status and Control Data Channel (SCDC) data.

8. The sink device of claim 6, wherein the CEC message includes Video Identification Code (VIC) information indicating specific resolution to be changed for the received video data.

9. The sink device of claim 8, wherein the sink device is configured to store VIC information indicating the changed resolution of the another video data, and wherein the changed resolution is configured as a default resolution for the source device.

10. The sink device of claim 8, wherein, when the error counter value is larger than the pre-configured threshold value, the sink device is configured to output a User Interface (UI) including a message suggesting replacement of an HDMI cable or downgrading video resolution.

11. A method for transmitting and receiving data of a source device by using a High Definition Multimedia Interface (HDMI), the method comprising:

obtaining video resolution information indicating video resolution supported by a sink device, by reading Extended Display Identification Data (EDID) of the sink device;

transmitting, to the sink device, video data based on the obtained video resolution information;

receiving, from the sink device, a Consumer Electronics Control (CEC) message requesting to change resolution of the transmitted video data; and transmitting, to the sink device, another video data with changed resolution according to the CEC message.

12. The method of claim 11, wherein the CEC message includes Video Identification Code (VIC) information indicating specific resolution to be changed for the transmitted video data.

13. The method of claim 12, wherein the changed resolution of the another video data is a downgraded resolution.

14. The method of claim 11, further comprising:

reading a Character Error Detection (CED) error counter value corresponding to the transmitted video data from Status and Control Data Channel (SCDC) data of the sink device.

15. A source device transmitting and receiving data by using a HDMI, the source device comprising:

an HDMI transmitter transmitting and receiving data through the HDMI; and a controller controlling data transmission and reception of the HDMI transmitter, wherein the source device is configured to:

obtain video resolution information indicating video resolution supported by a sink device, by reading Extended Display Identification Data (EDID) of the sink device;

transmit, to the sink device, video data based on the video resolution information;

receive, from the sink device, a Consumer Electronics Control (CEC) message requesting to change resolution of the transmitted video data; and transmit, to the sink device, another video data with changed resolution according to the CEC message.

16. The source device of claim 15, wherein the CEC message includes Video Identification Code (VIC) information indicating specific resolution to be changed for the transmitted video data.

17. The source device of claim 16, wherein the changed resolution of the another video data is a downgraded resolution.

18. The source device of claim 15, the source device is configured to read a Character Error Detection (CED) error counter value corresponding to the transmitted video data from Status and Control Data Channel (SCDC) data of the sink device.

* * * * *